(12) United States Patent
Goto et al.

(10) Patent No.: US 9,993,773 B2
(45) Date of Patent: Jun. 12, 2018

(54) ENERGY RECOVERY SYSTEM

(71) Applicant: Ebara Corporation, Tokyo (JP)

(72) Inventors: Akira Goto, Tokyo (JP); Shigeo Takita, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 7 days.

(21) Appl. No.: 15/128,333

(22) PCT Filed: Mar. 13, 2015

(86) PCT No.: PCT/JP2015/057500
§ 371 (c)(1),
(2) Date: Sep. 22, 2016

(87) PCT Pub. No.: WO2015/146639
PCT Pub. Date: Oct. 1, 2015

(65) Prior Publication Data
US 2017/0120194 A1    May 4, 2017

(30) Foreign Application Priority Data

Mar. 27, 2014    (JP) ................................ 2014-065903

(51) Int. Cl.
*B01D 61/06*    (2006.01)
*B01D 61/02*    (2006.01)
(Continued)

(52) U.S. Cl.
CPC ........... *B01D 61/06* (2013.01); *B01D 61/025* (2013.01); *C02F 1/441* (2013.01); *F01L 15/08* (2013.01);
(Continued)

(58) Field of Classification Search
None
See application file for complete search history.

(56) References Cited

U.S. PATENT DOCUMENTS 4,966,708 A * 10/1990 Oklejas ................ B01D 61/022
210/321.65
2009/0110563 A1    4/2009 Takita
(Continued)

FOREIGN PATENT DOCUMENTS

JP    H11-253761 A    9/1999
JP    2001-104954 A    4/2001
(Continued)

OTHER PUBLICATIONS

English translation of International Search Report issued in Application No. PCT/JP2015/057500 dated Jun. 16, 2015.

*Primary Examiner* — Krishnan S Menon
(74) *Attorney, Agent, or Firm* — Pearne & Gordon LLP

(57) ABSTRACT

An energy recovery system in a seawater desalination plant uses a reverse-osmosis membrane method for removing salinity from seawater. The system is configured to supply high-pressure water produced by pressurizing raw water with a high-pressure pump to a reverse-osmosis membrane cartridge, and to supply concentrated water discharged from the cartridge to an isobaric energy recovery device to recover pressure energy of the concentrated water whereby part of the raw water supplied to the isobaric energy recovery device is pressurized, and then to allow the pressurized raw water to merge into the high-pressure water pressurized by the high-pressure pump. The system includes a booster pump for boosting a pressure of the concentrated water discharged from the cartridge, and an energy recovery turbine for recovering energy by using the pressure head difference between the pressurized raw water from the isobaric energy recovery device and the high-pressure water discharged from the pump.

14 Claims, 5 Drawing Sheets

(51) Int. Cl.
    *C02F 103/08*     (2006.01)
    *F01D 15/08*     (2006.01)
    *C02F 1/44*     (2006.01)
    *F03B 13/00*     (2006.01)
    *F01L 15/08*     (2006.01)

(52) U.S. Cl.
CPC ........ *F03B 13/00* (2013.01); *B01D 2313/243* (2013.01); *B01D 2313/246* (2013.01); *B01D 2313/44* (2013.01); *B01D 2317/02* (2013.01); *C02F 2103/08* (2013.01); *C02F 2201/006* (2013.01); *C02F 2303/10* (2013.01); *F05B 2220/32* (2013.01)

(56) References Cited

U.S. PATENT DOCUMENTS

| | | | | |
|---|---|---|---|---|
| 2012/0168378 A1* | 7/2012 | Taniguchi | ............ | B01D 61/022 |
| | | | | 210/650 |
| 2015/0352497 A1* | 12/2015 | Sakai | ............ | C02F 1/441 |
| | | | | 210/252 |

FOREIGN PATENT DOCUMENTS

| | | | |
|---|---|---|---|
| JP | 2001-300264 | A | 10/2001 |
| JP | 2001-347142 | A | 12/2001 |
| JP | 2009-103109 | A | 5/2009 |
| JP | 2010-284642 | A | 12/2010 |
| JP | 2011-083741 | A | 4/2011 |
| WO | 2012-073693 | A1 | 6/2012 |

* cited by examiner

ENERGY RECOVERY SYSTEM

TECHNICAL FIELD

The present invention is particularly preferable for use as an energy recovery system serving as a consumption energy reduction means in a seawater desalination plant which uses a reverse-osmosis membrane method for removing salinity from seawater.

BACKGROUND ART

A seawater desalination plant which employs a reverse-osmosis membrane method is composed mainly of a pretreatment system, a high-pressure pump, a reverse-osmosis membrane cartridge, and an energy recovery system. In the seawater desalination plant, the intake seawater is processed to have certain water qualities by the pretreatment system, and the pretreated seawater is delivered into the reverse-osmosis membrane cartridge under pressure by the high-pressure pump. Part of the high-pressure seawater in the reverse-osmosis membrane cartridge passes through the reverse-osmosis membrane against the osmotic pressure and is desalinated, and fresh water is taken out from the reverse-osmosis membrane cartridge. The remaining seawater becomes in a concentrated state of a high salinity and is discharged as a reject from the reverse-osmosis membrane cartridge. More than half of electric power expense which is the largest operational cost in the seawater desalination plant is consumed for pressurizing the seawater by the high-pressure pump. Therefore, there have been proposed various methods for effectively recovering pressure energy possessed by the high-pressure reject with a high salinity discharged from the reverse-osmosis membrane cartridge.

For example, there is an energy recovery turbine which recovers kinetic energy of a high-speed jet produced by a nozzle or the like from the high-pressure reject with a turbine, and uses the recovered energy to assist in the power of a motor for driving the high-pressure pump. This system recovers the pressure energy of the reject by converting the pressure energy into turbine power and by using the turbine power to drive an impeller of the high-pressure pump whereby the turbine power is reconverted into pressure energy of the seawater. FIG. 1 shows such system, which is referred to as conventional art A. In this system, the energy of the fluid is recovered through two energy conversion processes, i.e., the process of converting fluid energy into shaft power and the process of converting the shaft power into fluid energy. Thus, this system is problematic in that even if the efficiency of the turbine and the efficiency of the high-pressure pump are 90% each, the overall energy recovery efficiency becomes low because the overall energy recovery efficiency is expressed by multiplication of both efficiencies (90%×90%=81%). Further, because the pump impeller and the turbine runner are disposed coaxially with each other, it is difficult to operate the turbine under optimum conditions at all times while following a change in operating conditions, resulting in a further efficiency reduction.

As an energy recovery system to solve the above problems, there is a system that employs an isobaric energy recovery device for recovering energy by a positive-displacement piston pumping action in which low-pressure pretreated seawater is pressurized by directly being pushed and pulled with a high-pressure reject through a piston in a chamber. This system is characterized in that the pressure energy possessed by the reject is recovered as fluid energy in a single energy conversion process by the isobaric energy recovery device, and thus the overall energy recovery efficiency becomes high efficiency of 90 to 98%. The piston in the chamber may be a cylindrical object that provides a physical partition wall between the pretreated seawater and the reject, or may be a hypothetical fluid piston in the form of an interface between the pretreated seawater and the reject. In this system, it is necessary to install a booster pump downstream of the isobaric energy recovery device because the pretreated seawater is pressurized to compensate for a pressure loss caused in the system and to merge into a high-pressure line. FIG. 2 shows such system, which is referred to as conventional art B. In this system, it is necessary to take some measures including the use of a variable-speed electric motor to drive the booster pump and the use of inverter control because there is a need for pressure compensation while following a change in pressure loss in the system due to environmental changes such as a temperature and a salinity, or membrane scaling, and the like. Because the suction pressure of the booster pump is nearly as high as the discharge pressure of the high-pressure pump and becomes a high-pressure condition, the booster pump is disadvantageous in that a pump having a special seal structure is required. Furthermore, attention should be paid to the controlling of the booster pump under transient operating condition which undergoes a change in operation condition, at the time of startup or shutdown.

In order to reduce the desalination costs incurred in producing fresh water in the seawater desalination plant, it is effective to increase the recovery rate and extract as much fresh water as possible from the same amount of intake seawater. Thus, there has been proposed a two-stage reverse-osmosis membrane system in which the reject from the above reverse-osmosis membrane cartridge is processed further by a second reverse-osmosis membrane cartridge. Since the reject from the first reverse-osmosis membrane cartridge has a higher salinity than the intake seawater, a second high-pressure pump may be disposed upstream of the second reverse-osmosis membrane cartridge in order to overcome an increase in the osmotic pressure thereof, thereby further boosting the pressure of the reject from the first reverse-osmosis membrane cartridge. In this case also, the reject from the second reverse-osmosis membrane cartridge has high pressure energy. Therefore, it is important to recover the high pressure energy of the reject as pressure energy of the high-pressure seawater directed toward the first and second reverse-osmosis membrane cartridges, and to reduce energy consumption of the entire system, as is the case with the single-stage reverse-osmosis membrane system.

The conventional art will be described below in detail.
(Conventional Art A)

A seawater desalination plant which employs a reverse-osmosis membrane method will be taken up, and the problems of the conventional art will specifically be described.

As shown in FIG. 1, the seawater 1 that has been supplied to the system by a feed pump 2 is processed to have certain water qualities by a pretreatment system 3, and is then pressurized by a high-pressure pump 5 driven by an electric motor 6 and delivered into a reverse-osmosis membrane cartridge 8. Part of the seawater in a high-pressure chamber 9 of the reverse-osmosis membrane cartridge passes through a reverse-osmosis membrane 10 against the osmotic pressure and is desalinated, and desalinated water 12 is taken out from a low-pressure chamber 11. The remaining seawater becomes in a concentrated state of a high salinity and is discharged as a concentrated reject from the reverse-osmosis membrane cartridge 8 to a reject line 13. The pressure energy of the high-pressure reject discharged from the reverse-osmosis membrane cartridge 8 is recovered as shaft power by an energy recovery turbine 14 having a rotating runner. The recovered power contributes to reduction of the shaft driving power of the electric motor 6 which is coaxially coupled to the turbine runner. The reject from which the pressure energy has been removed by the operation of the turbine 14 is discarded from a discharge line 15 to the outside of the system.

(Conventional Art B)

The conventional art B that employs an isobaric energy recovery device will be described below with reference to FIG. 2. According to the conventional art B, the pretreated seawater is pressurized by a positive-displacement piston pumping action in which the high-pressure energy possessed by the reject from a reverse-osmosis membrane cartridge is used to push and pull pistons in a plurality of pressure exchange chambers, thereby pressurizing the pretreated seawater and then discharging the pressurized seawater successively from the chambers.

The seawater 1 that has been supplied to the system by a feed pump 2 is processed to have certain water qualities by a pretreatment system 3, and is then pressurized by a high-pressure pump 5 driven by an electric motor 6 and delivered via a high-pressure line 7 into a reverse-osmosis membrane cartridge 8. On the other hand, part of the seawater in a high-pressure chamber 9 of the reverse-osmosis membrane cartridge passes through a reverse-osmosis membrane 10 against the osmotic pressure and is desalinated, and then desalinated water 12 is taken out from a low-pressure chamber 11. The remaining seawater becomes in a concentrated state of a high salinity and is discharged as a concentrated reject from the reverse-osmosis membrane cartridge 8 to a reject line 13. The pressure energy of the high-pressure reject discharged from the cartridge is introduced into pressure exchange chambers 20 sequentially through a control valve 19, whereby the respective pistons in the chambers are moved to pressurize the pretreated seawater in the chambers 20. The reject in each of the chambers which has moved the piston is disconnected from the reject line 13 by the control valve 19, and is discarded as a low-pressure reject from the chamber 20 to the outside of the system via a discharge line 15 while the reject is replaced by the pretreated seawater supplied from the supply line 4 to the chamber 20. The pretreated seawater having a low pressure in the chamber 20 which has replaced the reject is pressurized by the high-pressure reject newly introduced into the chamber 20 by the control valve 19. In this manner, the above cycle is repeated. By the isobaric energy recovery device 21 having the above structure, part of the seawater in the supply line 4 is pumped up and is discharged to the discharge line 22, and finally merges into the high-pressure line 7 from the outlet of the high-pressure pump 5. However, the fluid in the discharge line 22 has a lower pressure than the fluid in the high-pressure line 7 due to a pressure loss of the reverse-osmosis membrane cartridge 8 and the piping, a loss in the control valve 19, and the like. Therefore, in order to allow these fluids to merge together, a booster pump 17 driven by a variable-speed electric motor 18 is provided between the discharge line 22 and the high-pressure line 7.

CITATION LIST

Patent Literatures

Patent document 1: Japanese laid-open patent publication No. 2010-284642

SUMMARY OF INVENTION

Technical Problem

The present invention has been made in view of the above drawbacks. It is therefore an object of the present invention to provide an energy recovery system which can reduce the total consumption energy in a seawater desalination plant, and can follow a change in fluid properties, a change in process environment, and the like in a self-regulating manner (i.e., has a self-follow-up capability).

Solution to Problem

In order to achieve the above object, according to the present invention, there is provided an energy recovery system for supplying high-pressure water discharged from a high-pressure pump configured to pressurize raw water to a reverse-osmosis membrane cartridge configured to process the high-pressure water by a reverse-osmosis membrane to produce processed water, supplying concentrated water discharged from the reverse-osmosis membrane cartridge to an isobaric energy recovery device to recover pressure energy of the concentrated water whereby part of the raw water supplied to the isobaric energy recovery device is pressurized to become pressurized raw water, and making the pressurized raw water merge into the high-pressure water pressurized by the high-pressure pump, the energy recovery system comprising: a booster pump provided between the reverse-osmosis membrane cartridge and the isobaric energy recovery device and configured to boost a pressure of the concentrated water discharged from the reverse-osmosis membrane cartridge; and an energy recovery turbine configured to recover energy by using the pressure head difference between the pressurized raw water from the isobaric energy recovery device and the high-pressure water discharged from the high-pressure pump.

According to a preferred aspect of the present invention, the energy recovery system further comprises a second reverse-osmosis membrane cartridge configured to process the concentrated water discharged from the booster pump by a reverse-osmosis membrane to produce processed water; wherein the concentrated water discharged from the second reverse-osmosis membrane cartridge without being processed by the reverse-osmosis membrane is supplied to the isobaric energy recovery device.

According to a preferred aspect of the present invention, the energy recovery turbine uses the energy recovered by the energy recovery turbine to drive the high-pressure pump.

According to a preferred aspect of the present invention, the energy recovery turbine is configured to place a turbine and the high-pressure pump on a single rotating shaft.

According to a preferred aspect of the present invention, the energy recovery system further comprises a coupling configured to disconnect rotation of the turbine from rotation of the high-pressure pump.

According to a preferred aspect of the present invention, the energy recovery turbine uses the energy recovered by the energy recovery turbine to drive the booster pump.

According to a preferred aspect of the present invention, the energy recovery turbine is configured to place a turbine and the booster pump on a single rotating shaft.

According to a preferred aspect of the present invention, the energy recovery system further comprises a coupling configured to disconnect rotation of the turbine from rotation of the booster pump.

According to a preferred aspect of the present invention, the energy recovery system further comprises a bypass line branched from the line interconnecting the reverse-osmosis membrane cartridge and the booster pump; wherein the bypass line is connected to the line interconnecting the booster pump and the isobaric energy recovery device, and is provided with a valve.

According to a preferred aspect of the present invention, the energy recovery system further comprises a bypass line branched from the line interconnecting the reverse-osmosis membrane cartridge and the booster pump; wherein the bypass line is connected to the line interconnecting the second reverse-osmosis membrane cartridge and the isobaric energy recovery device, and is provided with a valve.

According to a preferred aspect of the present invention, the energy recovery system further comprises a line branched from the line for supplying the concentrated water to the isobaric energy recovery device and provided with a valve for discharging the concentrated water to the outside of the system.

According to the present invention, there is also provided a seawater desalination system for producing fresh water from seawater by pressurizing the seawater as raw water with a pump to allow the seawater to pass through a reverse-osmosis membrane cartridge, thereby separating the seawater into fresh water as processed water and concentrated seawater as concentrated water, the seawater desalination system comprising: the above-described energy recovery system for recovering pressure energy of the concentrated seawater discharged from the reverse-osmosis membrane cartridge.

According to a preferred aspect of the present invention, at the time of startup of the seawater desalination system, the valve in the bypass line branched from the line interconnecting the reverse-osmosis membrane cartridge and the booster pump is opened, and the high-pressure pump is started up, and thereafter the booster pump is started up.

According to a preferred aspect of the present invention, at the time of startup of the seawater desalination system, a valve in a turbine bypass line branched from the line interconnecting the isobaric energy recovery device and the energy recovery turbine is opened, and the isobaric energy recovery device is put into a state of stable operation, and thereafter the valve in the turbine bypass line is closed.

Advantageous Effect of Invention

According to the present invention, when the pressurized raw water pressurized by the isobaric energy recovery device is made to merge into the high-pressure water pressurized by the high-pressure pump, a turbine is disposed between a line for the isobaric energy recovery device and a line for the high-pressure pump to compensate for a pressure loss caused by the reverse-osmosis membrane, pipes, control valves in the isobaric energy recovery device, etc., in a self-regulating manner to follow a change in the loss due to a change in environmental conditions.

DESCRIPTION OF EMBODIMENTS

Figure 1:
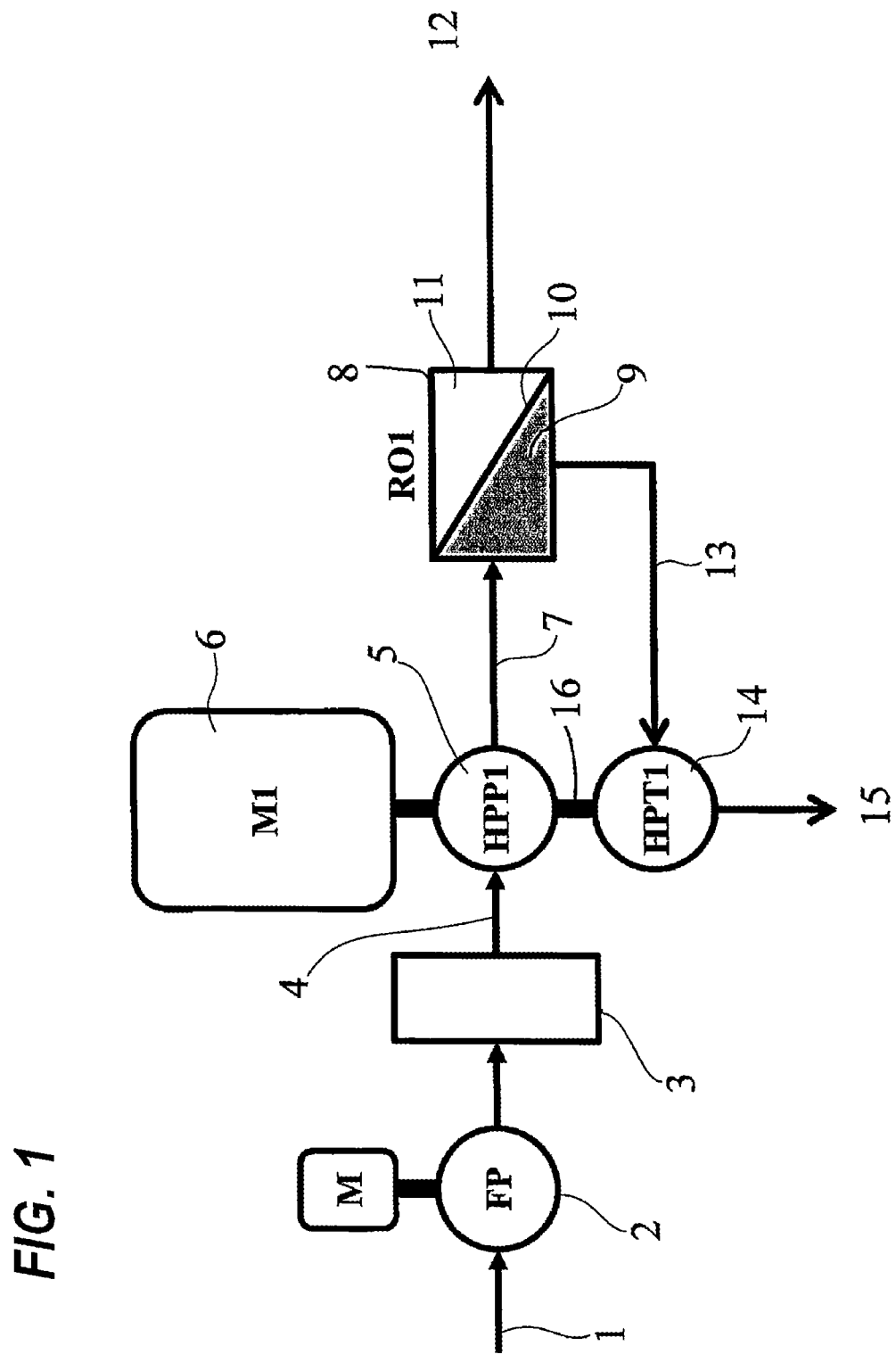
FIG. 1 is a schematic diagram showing a basic structure of an energy recovery system having a single-stage reverse-osmosis membrane cartridge and an energy recovery turbine according to conventional art.
Figure 2:
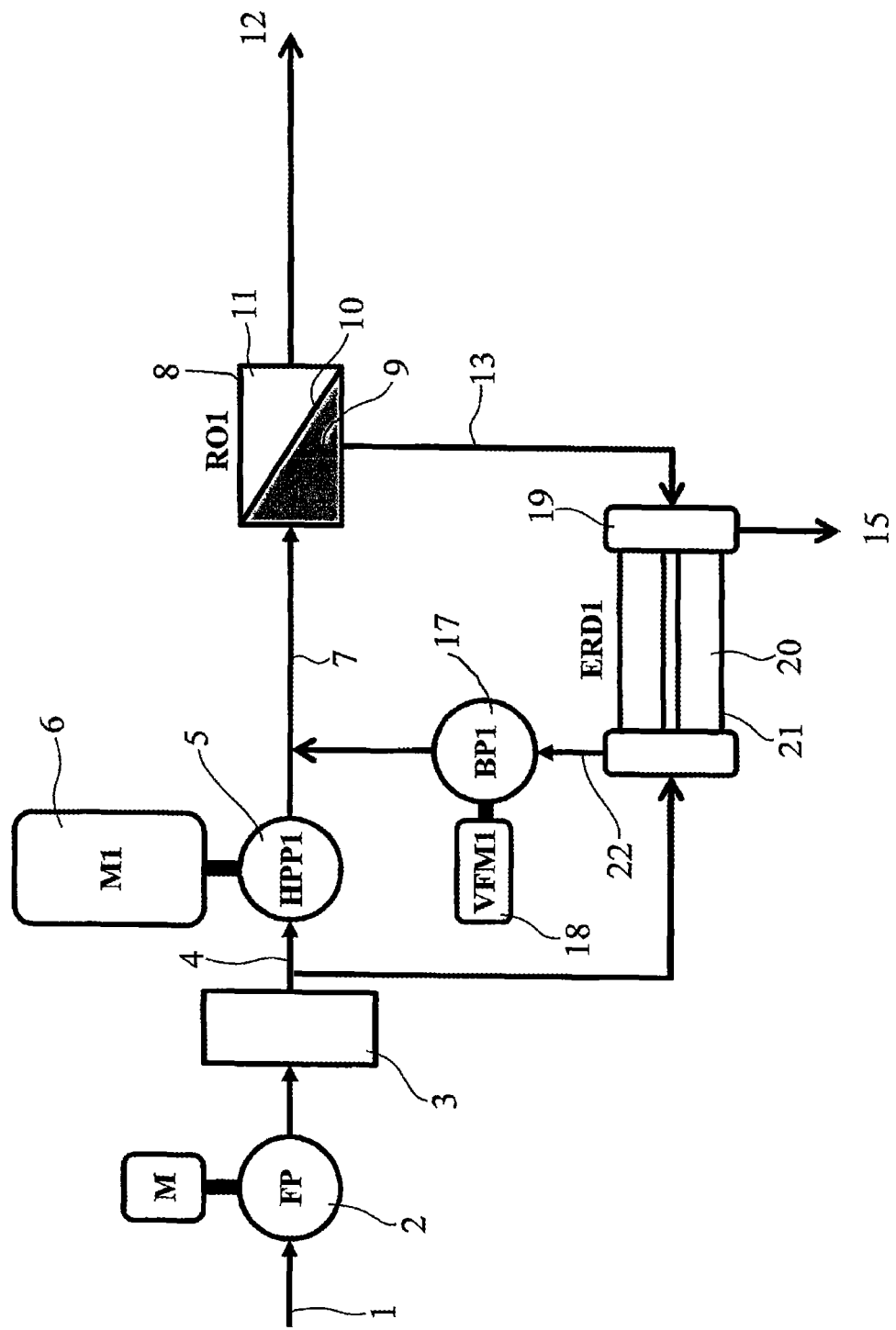
FIG. 2 is a schematic diagram showing a basic structure of an energy recovery system having a single-stage reverse-osmosis membrane cartridge and an isobaric energy recovery device according to conventional art.

An energy recovery system according to a preferred embodiment of the present invention will be described below with reference to FIG. 3. The seawater 1 that has been supplied to the system by a feed pump 2 is processed to have certain water qualities by a pretreatment system 3, and is then pressurized by a high-pressure pump 5 driven by an electric motor 6 and delivered via a high-pressure line 7 into a reverse-osmosis membrane cartridge 8. Part of the seawater in a high-pressure chamber 9 of the reverse-osmosis membrane cartridge passes through a reverse-osmosis membrane 10 against the osmotic pressure and is desalinated, and desalinated water 12 is taken out from a low-pressure chamber 11. The remaining seawater becomes in a concentrated state of a high salinity and is discharged as a concentrated reject from the reverse-osmosis membrane cartridge 8 to a reject line 13. The reject is further pressurized by a booster pump 44 driven by an electric motor 45, and then the pressurized reject is introduced into a pressure exchange chamber 20 through the control valve 19 to move the piston in the chamber. The reject which has moved the piston and finished energy conversion is discarded from a discharge line 15 to the outside of the system. By the isobaric energy recovery device 21 having the above structure, part of the pretreated seawater in the supply line 4 is pumped up and is discharged to the discharge line 22, and finally merges into the high-pressure line 7 from the outlet of the high-pressure pump 5. The fluid in the discharge line 22 is set to have a higher pressure than the fluid in the high-pressure line 7 by the operation of the booster pump 44, and the energy recovery turbine 14 is provided between the discharge line 22 and the high-pressure line 7, whereby pressure head difference between the two lines is converted effectively to the shaft power of the turbine runner. The power recovered by the energy recovery turbine 14 contributes to reduction of shaft driving power of the electric motor 6 which is coaxially coupled to the turbine runner through a rotating shaft 16. A coupling for disconnecting rotation of the energy recovery turbine 14 from rotation of the high pressure pump 5 may be provided. The high-pressure pump 5 can be smoothly started up by disconnecting the rotation, and the power of the electric motor 6 can be reduced by connecting the rotation at the time of steady operation.

The system according to the present invention is characterized in that the pressure loss caused from the high-pressure line 7 to the discharge line 22 of the isobaric energy recovery device 21 is compensated for by the booster pump 44, and the system is self-regulated to follow a change in operating conditions including a time-depending change due to seawater temperature, membrane scaling, and the like. The system is greatly advantageous in that the system eliminates the need for variable-speed motor control of the booster pump 17 which has been required in the conventional art B and which is inherent in the isobaric energy recovery device, and thus can realize a control-free system configuration. For example, at the time of seawater temperature change or membrane scaling, in the case where the pressure in the high-pressure line 7 extending to the reverse-osmosis membrane cartridge 8 is varied and adjusted in order to maintain a predetermined amount of desalinated water, the overall line pressure from the high-pressure line 7 to the discharge line 22 varies essentially uniformly. Therefore, the pressure head difference between the high-pressure line 7 and the discharge line 22 does not greatly vary from a design value, and thus the turbine 14 can maintain its operation in a self-regulating manner with high efficiency. The pressure head difference between the two lines which has been recovered and converted into the shaft power of the turbine runner may be converted into electric power for operating the high-pressure pump 5 and the booster pump 44 or may be used to contribute to the operation of the booster pump 44 by allowing the turbine 14 to be connected coaxially to the booster pump 44. Further, it is preferable to provide a bypass line 40 branched from the line for interconnecting the reverse-osmosis membrane cartridge 8 and the booster pump 44, and to connect the bypass line 40 to the line for interconnecting the booster pump 44 and the isobaric energy recovery device 21 and to equip the bypass line 40 with a valve 41. This is because when the seawater desalination system is started up, the bypass line 40 is effective to start up the system while preventing the booster pump 44 from corotating. Furthermore, it is preferable to provide a turbine bypass line 47 branched from the line for interconnecting the isobaric energy recovery device 21 and the turbine 14, and to connect the turbine bypass line 47 to the high-pressure line 7 and to equip the turbine bypass line 47 with a valve 48. This is because when the seawater desalination system is started up, the turbine bypass line 47 is effective to start up the system while avoiding a blockage by the turbine 14 by operating the turbine 14 after the isobaric energy recovery device 21 secures a sufficient flow rate of pressure-converted seawater and becomes in a stable operating state.

An energy recovery system according to a more preferred second aspect of the present invention will be described below with reference to FIG. 4. The seawater 1 that has been supplied to the system by a feed pump 2 is processed to have certain water qualities by a pretreatment system 3, and is then pressurized by a high-pressure pump 5 driven by an electric motor 6 and delivered via a high-pressure line 7 into a first reverse-osmosis membrane cartridge 8. Part of the seawater in a high-pressure chamber 9 of the reverse-osmosis membrane cartridge 8 passes through a reverse-osmosis membrane 10 against the osmotic pressure and is desalinated, and desalinated water 12 is taken out from a low-pressure chamber 11. The remaining seawater becomes in a concentrated state of a high salinity and is discharged as a concentrated reject from the reverse-osmosis membrane cartridge 8 to a reject line 13. The reject is further pressurized by a booster pump 44 driven by an electric motor 45, and then the pressurized reject is delivered through a high-pressure line 25 to a second reverse-osmosis membrane cartridge 26. Part of the seawater in a high-pressure chamber 27 of the second reverse-osmosis membrane cartridge 26 passes through a reverse-osmosis membrane 28 against the osmotic pressure and is desalinated, and desalinated water 12 is taken out from a low-pressure chamber 29. The remaining seawater is discharged as a further concentrated reject with a high salinity from the second reverse-osmosis membrane cartridge 26 to a reject line 30.

The pressure energy of the high-pressure reject that has been discharged from the second reverse-osmosis membrane cartridge 26 to the reject line 30 is introduced through a control valve 19 into a pressure exchange chamber 20 to move a piston in the chamber. The reject which has moved the piston and finished energy conversion is discarded from a discharge line 15 to the outside of the system. By the isobaric energy recovery device 21 having the above structure, part of the pretreated seawater in a supply line 4 is pumped up and is discharged to the discharge line 22, and finally merges into the high-pressure line 7 from the outlet of the high-pressure pump 5. However, since the discharge line 22 is higher in pressure than the high-pressure line 7 by a two-stage pressurizing effect, an energy recovery turbine 14 is disposed between the discharge line 22 and the high-pressure line 7, whereby the pressure head difference between the two lines is converted to the shaft power of the turbine runner. The power recovered by the energy recovery turbine 14 contributes to reduction in shaft driving power of the electric motor 6 which is coaxially coupled to the turbine runner through a rotating shaft 16. A coupling for disconnecting rotation of the energy recovery turbine 14 from rotation of the high-pressure pump 5 may be provided. The high-pressure pump 5 can be smoothly started up by disconnecting the rotation, and the power of the electric motor 6 can be reduced by connecting the rotation at the time of steady operation.

Figure 5:
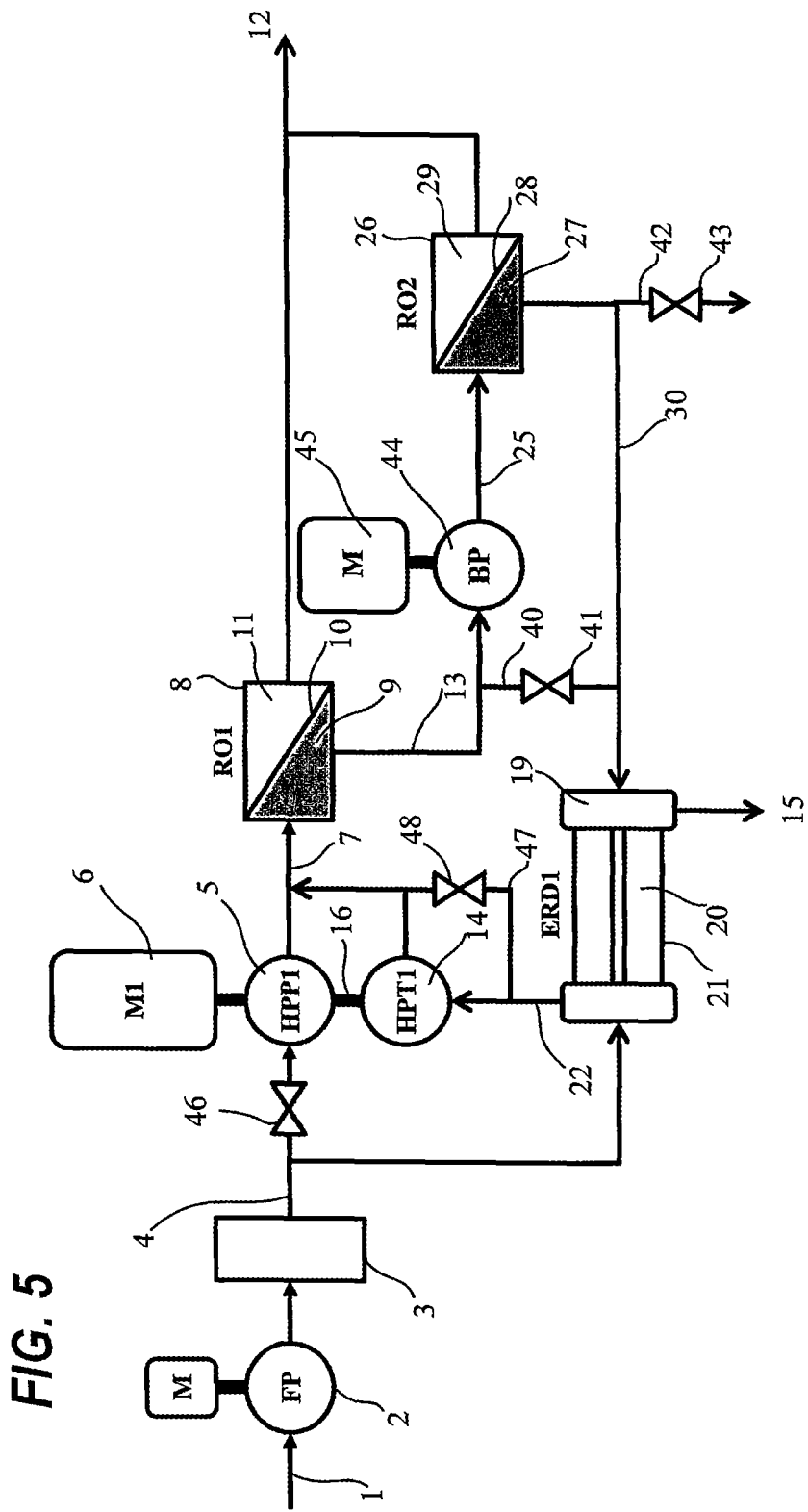
FIG. 5 is a diagram showing an installation configuration of various values in the energy recovery system according to the second aspect of the present invention.

The system according to the present invention employs the isobaric energy recovery device 21 with high efficiency, and can eliminate the booster pump 17, which has been heretofore required and has been a special pump having a high suction pressure and driven by the variable-speed electric motor 18. Further, the system is self-regulated to follow a change in operating conditions including a time-depending change due to seawater temperature, membrane scaling, and the like. The system is greatly advantageous in that the system eliminates the need for variable-speed motor control inherent in the isobaric energy recovery device, and thus can realize a control-free system configuration. The present invention is particularly effective for the system that requires complex control for transient operations or the like, such as a system that employs a two-stage pressurizing reverse-osmosis membrane method which is used for producing an increased amount of desalinated water. For example, at the time of seawater temperature change or membrane scaling, in the case where the pressure in the high-pressure line 7 extending to the reverse-osmosis membrane cartridge 8 is varied and adjusted in order to maintain a predetermined amount of desalinated water, the overall line pressure from the high-pressure line 7 to the discharge line 22 varies essentially uniformly. Therefore, the pressure head difference between the high-pressure line 7 and the discharge line 22 does not greatly vary from a design value, and thus the turbine 14 can maintain its operation in a self-regulating manner with high efficiency. The pressure head difference between the two lines which has been recovered and converted into the shaft power of the turbine runner may be converted into electric power for operating the high-pressure pump 5 and the booster pump 44 or may be used to contribute to the operation of the booster pump 44 by allowing the turbine 14 to be connected coaxially to the booster pump 44. Further, as shown in FIG. 5, it is preferable to provide a bypass line 40 branched from the line for interconnecting the reverse-osmosis membrane cartridge 8 and the booster pump 44, and to connect the bypass line 40 to the line for interconnecting the booster pump 44 and the isobaric energy recovery device 21 and to equip the bypass line 40 with a valve 41. This is because the bypass line 40 is effective to start up the system while preventing the booster pump 44 from corotating when the seawater desalination system is started up. Furthermore, as shown in FIG. 5, it is preferable to provide a turbine bypass line 47 branched from the line for interconnecting the isobaric energy recovery device 21 and the turbine 14, and to connect the turbine bypass line 47 to the high-pressure line 7 and to equip the turbine bypass line 47 with a valve 48. This is because when the seawater desalination system is started up, the turbine bypass line 47 is effective to start up the system while avoiding a blockage by the turbine 14 by operating the turbine 14 after the isobaric energy recovery device 21 secures a sufficient flow rate of pressure-converted seawater and becomes in a stable operating state.

A method of starting up the seawater desalination plant which uses a reverse-osmosis membrane method for removing salinity from the seawater will be described below.

FIG. 5 is a diagram showing a system configuration according to a second aspect of the present invention, which additionally includes valves and bypass pipes required for a control system.

A bypass line 40 and a first valve 41 are provided between the reject line 13 for interconnecting the first reverse-osmosis membrane cartridge 8 and the booster pump 44 and the reject line 30 for interconnecting the second reverse-osmosis membrane cartridge 26 and the isobaric energy recovery device 21. A discharge line 42 and a second valve 43 are provided for discharging the concentrated seawater from the reject line 30 extending from the second reverse-osmosis membrane cartridge 26, to the outside of the system. A valve 46 for preventing the high-pressure pump 5 from corotating at the time of startup is provided in the supply line 4 of the high-pressure pump 5.

Figure 3:
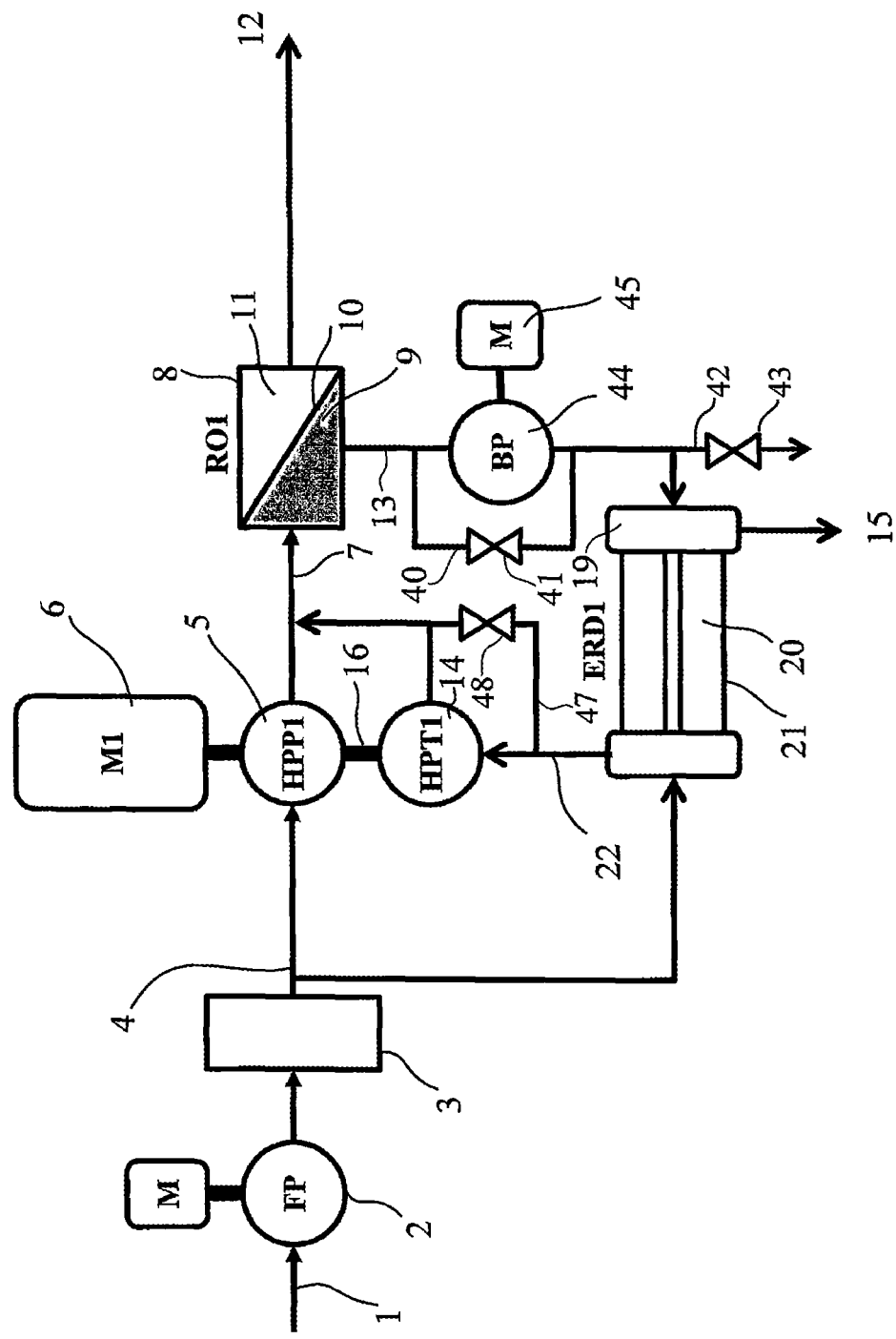
FIG. 3 is a diagram showing an energy recovery system according to a first aspect of the present invention.
Figure 4:
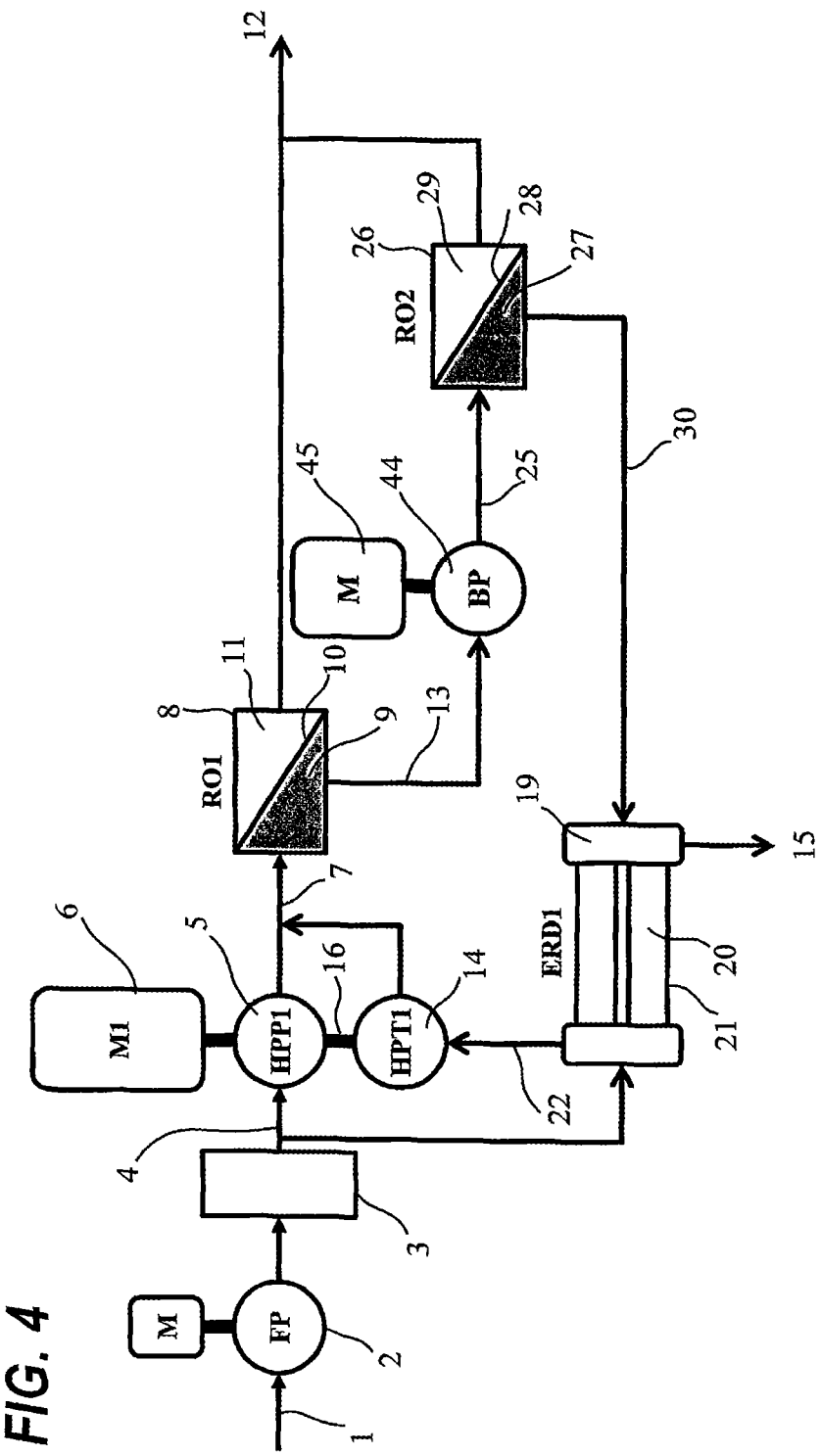
FIG. 4 is a diagram showing an energy recovery system according to a second aspect of the present invention.

When the systems shown in FIGS. 3 to 5 are started up, the supply line 4 and the discharge line 15 are connected to each other by the control valve 19 of the isobaric energy recovery device 21. Further, the valve 48 is opened to connect the turbine bypass line 47 to the high-pressure line 7. The valve 48 is arranged to cause a loss corresponding to the pressure head difference produced when the turbine 14 is in rated operation. After the low-pressure feed pump 2 is started up, the valve 41 in the bypass line 40 and the valve 43 in the discharge line 42 are opened, and then the first high-pressure pump 5 is started up. At this time, in order to avoid damage to the reverse-osmosis membrane cartridge due to an abrupt increase in the membrane pressure, it is desirable to install a slow starter in the electric motor 6 for the high-pressure pump 5. Thereafter, the booster pump 44 is started up, and the valve 41 in the bypass line 40 is closed. Then, while the valve 43 in the discharge line 42 is gradually closed, the control valve 19 of the isobaric energy recovery device 21 starts to be controlled. When the valve 43 is fully closed, the isobaric energy recovery device 21 is shifted to the state of steady operation. While the valve 48 is gradually closed, the turbine bypass line 47 is closed to switch the entire amount of the seawater to the turbine 14. By this switching, the shaft power recovered by the energy recovery turbine 14 is self-regulated depending on the pressure head difference produced between the discharge line 22 and the high-pressure line 7, and thus it is not necessary to apply special control to the fluid devices used in the present system.

The embodiments of the present invention have been described above, it will be understood that the present invention is not limited to the above embodiments, but various different changes and modifications may be made thereto within the scope of the technical concept of the invention.

INDUSTRIAL APPLICABILITY

The present invention is applicable to an energy recovery system serving as a consumption energy reduction means in a seawater desalination plant which uses a reverse-osmosis membrane method for removing salinity from seawater.

REFERENCE SIGNS LIST 1 seawater
2 feed pump
3 pretreatment system
4 supply line
5 high-pressure pump
6 electric motor
7 high-pressure line
8 reverse-osmosis membrane cartridge
9 high-pressure chamber
10 reverse-osmosis membrane
11 low-pressure chamber
12 desalinated water
13 reject line
14 turbine
15 discharge line
16 rotating shaft
17 booster pump
18 variable-speed electric motor
19 control valve
20 pressure exchange chamber
21 isobaric energy recovery device
22 discharge line
25 high-pressure line
26 second reverse-osmosis membrane cartridge
27 high-pressure chamber
28 reverse-osmosis membrane
29 low-pressure chamber
30 reject line
40 bypass line
41 valve
42 discharge line
43 valve
44 booster pump
45 electric motor
46 valve
47 turbine bypass line
48 valve

The invention claimed is:

1. An energy recovery system for processing raw water, comprising:
   a high-pressure pump, whereby part of the raw water is supplied to the high-pressure pump, the high-pressure pump being configured to pressurize the part of the raw water to become high-pressure raw water that is discharged from the high-pressure pump;
   a reverse-osmosis membrane cartridge configured to process the high-pressure raw water discharged from the high-pressure pump by a reverse-osmosis membrane to produce processed water and concentrated water that are discharged from the reverse-osmosis membrane cartridge;
   an isobaric energy recovery device configured to recover pressure energy of the concentrated water discharged from the reverse-osmosis membrane cartridge, whereby another part of the raw water is supplied to the isobaric energy recovery device and is pressurized by the isobaric energy recovery device to become pressurized raw water, which is discharged from the isobaric energy recovery device and merges into the high-pressure raw water discharged by the high-pressure pump;

a booster pump provided between the reverse-osmosis membrane cartridge and the isobaric energy recovery device and configured to boost a pressure of the concentrated water discharged from the reverse-osmosis membrane cartridge; and an energy recovery turbine configured to recover energy by using the pressure head difference between the pressurized raw water from the isobaric energy recovery device and the high-pressure raw water discharged from the high-pressure pump.

2. The energy recovery system according to claim 1, further comprising:

a second reverse-osmosis membrane cartridge configured to process the concentrated water discharged from the booster pump by a second reverse-osmosis membrane to produce processed water;

wherein concentrated water discharged from the second reverse-osmosis membrane cartridge is supplied to the isobaric energy recovery device.

3. The energy recovery system according to claim 1, wherein the energy recovery turbine is configured to use the energy recovered by the energy recovery turbine to drive the high-pressure pump.

4. The energy recovery system according to claim 3, wherein the energy recovery turbine is configured to place a turbine and the high-pressure pump on a single rotating shaft.

5. The energy recovery system according to claim 4, further comprising:

a coupling configured to disconnect rotation of the turbine from rotation of the high-pressure pump.

6. The energy recovery system according to claim 1, wherein the energy recovery turbine uses the energy recovered by the energy recovery turbine to drive the booster pump.

7. The energy recovery system according to claim 6, wherein the energy recovery turbine is configured to place a turbine and the booster pump on a single rotating shaft.

8. The energy recovery system according to claim 7, further comprising:

a coupling configured to disconnect rotation of the turbine from rotation of the booster pump.

9. The energy recovery system according to claim 1, further comprising:

a bypass line branched from the line interconnecting the reverse-osmosis membrane cartridge and the booster pump;

wherein the bypass line is connected to the line interconnecting the booster pump and the isobaric energy recovery device, and is provided with a valve.

10. The energy recovery system according to claim 2, further comprising:

a bypass line branched from the line interconnecting the reverse-osmosis membrane cartridge and the booster pump;

wherein the bypass line is connected to the line interconnecting the second reverse-osmosis membrane cartridge and the isobaric energy recovery device, and is provided with a valve.

11. The energy recovery system according to claim 1, further comprising:

a line branched from the line for supplying the concentrated water to the isobaric energy recovery device and provided with a valve for discharging the concentrated water to the outside of the system.

12. A seawater desalination system comprising the energy recovery system according to claim 1, wherein the raw water supplied to the high-pressure pump and isobaric energy recovery device corresponds to sea water and the processed water produced by the reverse-osmosis membrane cartridge corresponds to fresh water.

13. The seawater desalination system according to claim 12, wherein at the time of startup of the seawater desalination system, the valve in a bypass line branched from the line interconnecting the reverse-osmosis membrane cartridge and the booster pump is opened, and the high-pressure pump is started up, and thereafter the booster pump is started up.

14. The seawater desalination system according to claim 12, wherein at the time of startup of the seawater desalination system, a valve in a turbine bypass line branched from the line interconnecting the isobaric energy recovery device and the energy recovery turbine is opened, and the isobaric energy recovery device is put into a state of stable operation, and thereafter the valve in the turbine bypass line is closed.

\* \* \* \* \*